Dec. 28, 1954　　　E. H. BOASSON ET AL　　　2,697,854
PROCESS AND APPARATUS FOR MAKING ELONGATED
BARS, BLOCKS, AND THE LIKE
Filed March 12, 1951　　　　　　　　　　　　2 Sheets-Sheet 1
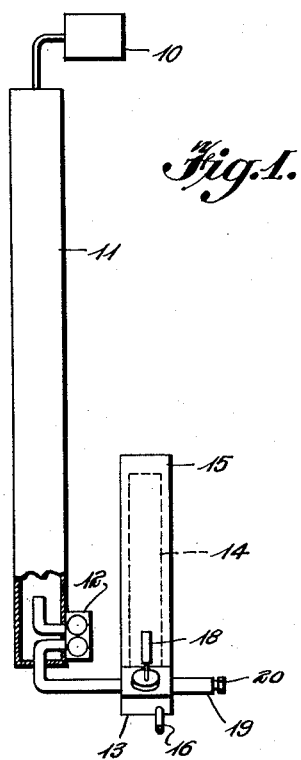
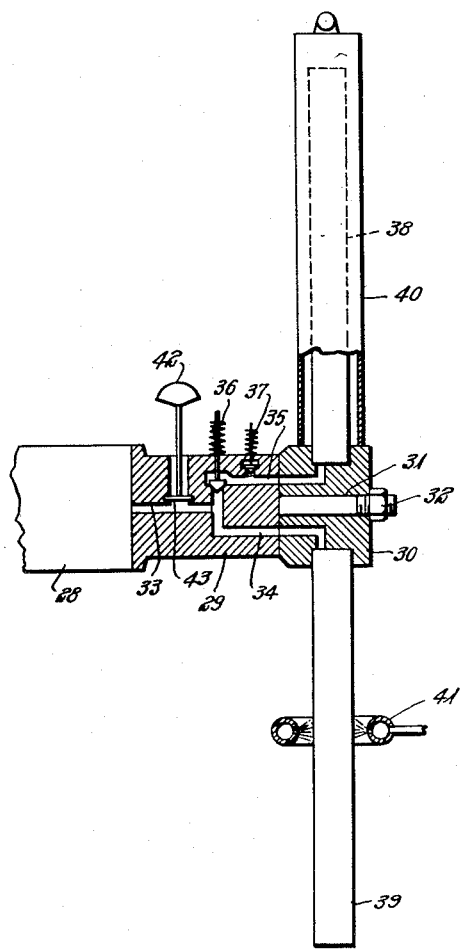
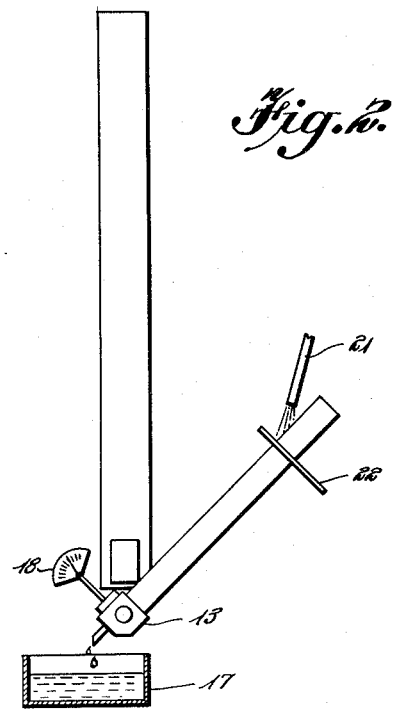
INVENTORS
*Eduard Hein Boasson* and
*Jan Lodewijk Voigt*
BY *Stevens, Davis, Miller & Mosher*
ATTORNEYS Dec. 28, 1954  E. H. BOASSON ET AL  2,697,854
PROCESS AND APPARATUS FOR MAKING ELONGATED
BARS, BLOCKS, AND THE LIKE
Filed March 12, 1951  2 Sheets-Sheet 2

INVENTORS
Eduard Hein Boasson and
Jan Lodewijk Voigt
BY Stevens, Davis, Miller & Mosher
ATTORNEYS United States Patent Office 2,697,854
Patented Dec. 28, 1954

2,697,854

PROCESS AND APPARATUS FOR MAKING ELONGATED BARS, BLOCKS, AND THE LIKE

Eduard Hein Boasson, Arnhem, and Jan Lodewijk Voigt, Ede, Netherlands, assignors to N. V. Onderzoekingsinstituut Research, Arnhem, Netherlands, a corporation of the Netherlands Application March 12, 1951, Serial No. 215,122

Claims priority, application Netherlands March 21, 1950

7 Claims. (Cl. 18—30)

The invention relates to a process for manufacturing bars and blocks and suchlike articles, in which in one direction the dimension of the objects formed is many times larger than the dimensions in the two other directions, as this is the case with bars, beam-shaped blocks and profiles with a pronounced longitudinal direction, which articles can also have far larger dimensions in the other directions than those which are permissible for the well-known so-called injection moulding.

In this well-known injection moulding of substances, such as polyamides and similar artificial materials having a narrow melting range, the molten material is suddenly injected under very high pressure, which often amounts to 1500 at., into the cold moulds, in which it solidifies almost immediately. During this solidification of these substances a solidification shrinkage occurs, which is in general rather large and which amounts for example for polyamides to about 15%.

In consequence of the solidification shrinkage and the narrow melting range, it is not possible to manufacture bars and suchlike objects from polyamides and suchlike materials with the aid of an extrusion machine, as this is done for artificial materials having a wide melting range, for example cellulose acetate and polyvinylchloride.

In the French Patent No. 879,054 it is proposed to manufacture bars and suchlike products from polyamides by allowing the molten mass to solidify under pressure in an hermetically closed mould. The pressure applied during this process is effected either with the aid of a gas or by means of a piston or by completely filling the mould with powdered substance and by then allowing this to melt in the hermetically closed mould and by cooling it again.

Elaborate experiments showed that in these processes it was not possible to obtain a product without flaws and suchlike irregularities.

The manufacturing of bars and suchlike objects by means of the injection moulding process has the very large disadvantage that for this purpose, in so far as it may be possible, the injection moulding machine required must have an abnormally large capacity.

The process according to the present invention makes it possible to manufacture bars, blocks and suchlike materials, which can weigh 1 kg. or more, which are completely homogeneous without particularly expensive machines being required for this.

The process according to the invention is characterized in that after filling a pre-heated mould with molten material the cooling of the mould by exterior means is allowed to begin in a regulatable way on a part of the mould which is at a distance from the filling side, this cooling thereupon being allowed to progress at controlled rate to the filling side and molten material being supplied under pressure during this cooling.

It is possible to cool in various ways, if only care is taken that the material in and near the filling opening remains molten until the last moment, so that a supply of molten material under pressure for compensating for the solidification shrinkage always remains available.

It is therefore an object of this invention to provide an improved process for manufacturing bars, blocks and the like, which process results in the manufacture of superior products.

More particularly, it is an object of this invention to provide an improved process for the moulding of bars, blocks and the like.

Other and further objects will become apparent from a discussion of the attached drawings.

Figure 1 is a front elevation partly in section of one form of the apparatus used in practicing the process of this invention;

Figure 2 is a side elevation of the apparatus of Figure 1 with the replacement of one part thereof with another element;

Figure 5 is a side elevation, partly in section, of another embodiment of this invention.

Figure 3:
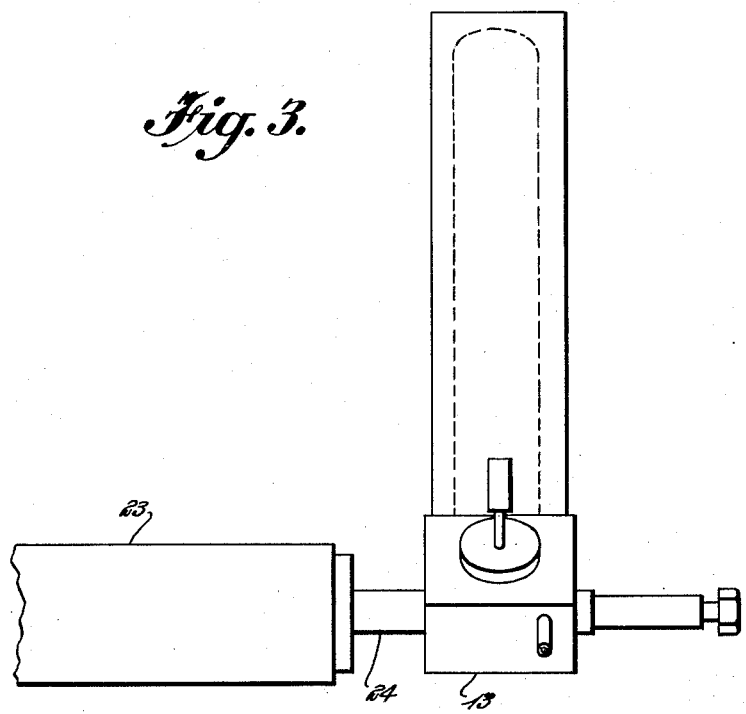
Figure 3 is a side elevation of another embodiment of the apparatus used in practicing the process of this invention.

Generally the process contemplates injecting a fluid material while under pressure into a preheated mould and then solidifying the material by a regulatable cooling step. A good representative illustration of the principles of this invention can be had by considering, with the aid of the drawings, the production of bars, blocks, profiles, etc., of a high molecular weight substance such as polyamino caproic acid derived by condensation of a low molecular weight raw material such as epsilon-caprolactam. It has been found that a low pressure process such as the instant one can be improved appreciably by not starting from a granular product, but from the product in molten condition. This eliminates granulation, drying, remelting, etc. As shown in Figures 1 and 2, the starting material, epsilon-caprolactam, is taken from a supply tank 10 and fed to a column 11 wherein takes place the continual conversion of the caprolactam to the molten polyamide. The converted material, in the molten state, is fed by a transport mechanism into a preheated mould. As shown in these figures, the molten material is tapped off the bottom of the column 11 and is forced by a gear pump 12 into a housing 13.

In the housing 13, through which a mould 14 is filled, there is a valve for regulating the pressure in the supply channel to the mould. A suitable valve for this purpose will be described in more detail with reference to Figure 5.

As heretofore stated, the molten material is, by suitable means, forced through the housing 13 into the mould 14. This mould, during the injection of the fluid material, is preheated by an oven 15 surrounding it. After the mould is filled, the oven is removed and the cooling takes place.

The material that passes through the valve during the cooling phase can flow out through the discharge or overflow channel 16. The discharge of excess material is collected in the tank 17 with excess refrigerant. The pressure in the supply channel is read on the clock gauge 18, which is connected to a diaphragm present in the interior of the housing 13. The diaphragm reacts to the pressure of the material present underneath. For regulating the valve in the housing and thus the pressure in the supply channel to the mould, a spiral spring is provided around the stem of the valve, said spring projecting out of the housing and being surrounded by a sleeve 19. A screw 20 is used to adjust the tension of the spiral spring in the sleeve 19. The housing is, of course, kept at a temperature which is higher than the melting point of the fluid material.

As shown in Figure 2, the supply of refrigerant to the mould 14, the oven 15 having been removed, takes place through a nozzle 21. The refrigerant may, for instance, be water. By means of a removable cuff or collar 22, made of, for example, rubber, the part of the mould which is being cooled is bounded and the part which is thus subjected to the action of the refrigerant is regularly increased by the displacement of the collar in the direction of the housing 13. After the collar has approached the housing as closely as possible, the cooling in this position is continued for some time. As an example, for a bar of polyamino caproic acid with a diameter of 50 mm., the cooling may be carried out by displacing the collar at the rate of 3 centimeters per minute while the after-cooling period is of the order of 10 to 15 minutes.

The cooling, which progresses at a controlled rate along the length of the mould in a direction toward the filling side, can be effected in various ways provided that this is done in a regulatable manner so that the speed of the cooling and that of the progressing along the length of the mould is adapted to the thickness of the object to be moulded. It is possible to allow the mould which has been filled from below to rotate after filling, whereby the supply under pressure is maintained so that the filling opening is then present at the highest point. By slowly moving a trough containing cooling liquid in an upward direction, the mould can thereupon be gradually immersed in this cooling liquid. It is possible to provide a system of channels around the mould, which mould is directed vertically upward, through which channels the cooling liquid can flow in such a way that the top channels are used first and the channels lying lower are then successively filled with cooling liquid.

A very simple arrangement is obtained by giving the mould an upward direction at an angle of about 30 to 45°. A rubber cuff is pushed around the filled mould, while now the cooling liquid simply flows on the end of the mould. The cooling liquid flows away via the cuff. The progressing of the cooling at the desired speed is regulated by slowly pushing this cuff over the mould in downward direction.

Another embodiment is, for example, surrounding the mould with thin, hollow tubes with various branches, so that the cooling liquid first circulates through only a small part of these tubes, and after that through all the tubes.

Figure 4:
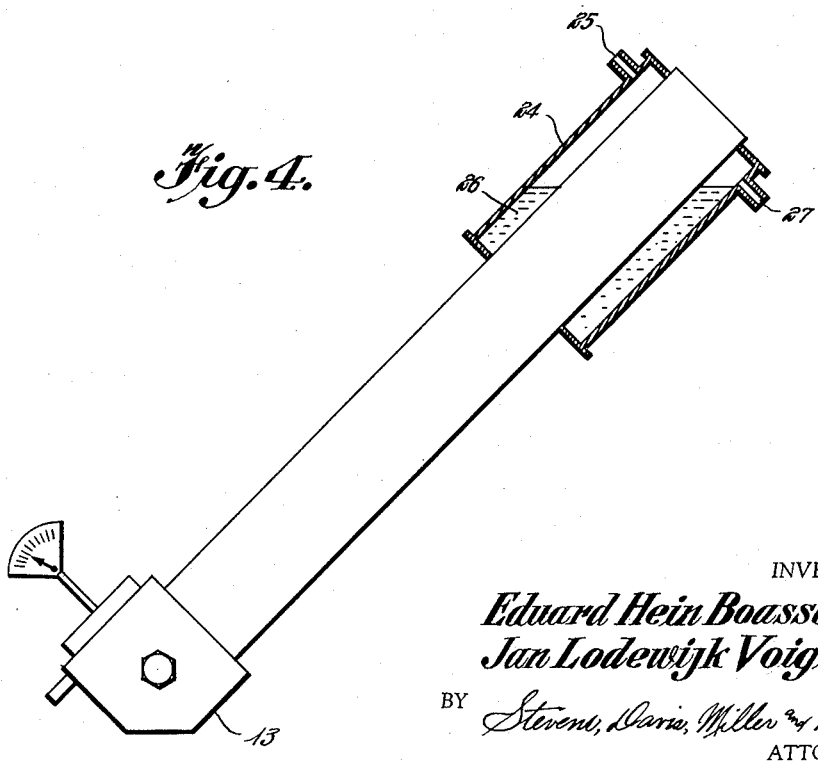
Figure 4 is a side elevation of the apparatus of Figure 3 with the replacement of one part thereof with another element.

Generally speaking, polyamides may be used as the fluid material and any convenient means of forcing, under pressure, the material into a preheated mould may be used. The polyamides are guided from below, in order to prevent occlusion of gas, into the preheated mould. As soon as the mould is completely filled the cooling starts. If an extrusion machine is used, the supply channel may be provided with an overflow channel which starts operating at an adjustable, i. e., predetermined, pressure. The material which is discharged through this overflow channel during the cooling can be collected and processed again. The extrusion machine may be driven by a slip clutch means of which a constant maximum liquid pressure on the mould can be obtained. An example of this invention using as a supplying device an extrusion machine and another type of cooling system, is shown in Figures 3 and 4. The extrusion machine 23 forces the fluid material through the supply channel 24 into a system as described with relation to Figures 1 and 2. In Figure 4 the collar or cuff 22 of Figures 1 and 2 has been replaced by a cooling jacket 24 having an inlet 25 for cooling material 26 and an outlet 27 therefor. The jacket is moved at a regulatable speed toward the housing 13.

It must be remembered that as a result of this regulatable cooling which is allowed to proceed at a controllable rate in the direction towards the filling end of the mould from that point which is preferably at the greatest distance from the filling end, fluid material must be supplied for compensating for the solidification shrinkage until the whole content of the mould has solidified. In order to insure that during the cooling the mould will be supplied with fluid material, the supply channel is provided with an overflow channel which starts operating at an adjustable, i. e., predetermined, pressure. The overflow material may be collected and reprocessed or it may be used to fill other moulds which are in turn cooled under pressure and processed in the same way as the first mould. By doing this, the capacity of the polymer melting and supplying device is completely utilized for the desired purpose. On the one hand, this gives a higher production for a given polymer melting and supplying device, and on the other, the cost for the granulation and drying of discharge material need no longer be made. Since the duration of the cooling period is not unimportant in comparison with the filling period, the saving in consequence of this expedient is appreciable. The filled moulds, which have been filled via the overflow device, should, in their turn, be cooled under pressure and therefore it is necessary to connect the moulds which are coupled to the overflow device. This can be done in various ways. For further elucidating this part of the invention, reference is now made to Figure 5.

In this figure, an extrusion machine is indicated by numeral 28 which is connected to a feeding device 29, the part 30 of which, lying opposite the extrusion machine, is rotatable. This movement of the part 30 takes place around the axle 31 and with the aid of the gripping member 32 the part 30 can be fastened. In the feeding device 29, the supply channel 33 is present. This supply channel is divided into two parts 34 and 35, of which 35 is the overflow channel with the overflow valve 36 and the safety valve 37. The channels 34 and 35 lead to corresponding channels in the rotatable part 30 and thus the parts of the channel and the rotatable part are interchangeable. The channel 35 serves for filling a mould 38, while at the same time an already filled mould 39 is cooled, and is filled with the molten material via the channel 34. The feeding device 29 with the rotatable part 30 is heated in the usual manner above the melting temperature of the material passing through. In the operating position indicated in the figure, a heating device 40 is present around the mould 38 and the cooling ring 41 around the mould 39. When putting the device in operation, the mould 39 is placed in the position occupied in Figure 5 by mould 38 and the supply channel 34 is closed by means of a plug. After filling the mould 39, the part 30 is turned and the plug removed. Thereupon, the mould 38 is provided in the place of the plug and is thus connected to the filling channel 35. The heating device 40 which has been removed from the mould 39 is provided around the mould 38, while the cooling ring 41 is provided around the lower part of the mould 39 and is pushed up along the mould at a certain rate. For a mould with an inner diameter of 44 millimeters, this rate may, for example, mount to about 7 millimeters per minute. The spring tension of the overflow valve 36 is adjusted in such a way that the clock gauge 42, which is connected to the diaphragm 43, indicates a pressure of about 50 atmospheres. In the operating position shown in this figure, the mould 39 has already cooled partly and the material supply takes place under pressure via the supply channel 34. At the same time the mould 38 is filled with overflow material admitted through the channel 35 via the overflow valve 36 and this mould is heated by the heating device 40 in a controlled manner. When the cooling ring 41 has arrived at the top side of the mould 39, it is left in this position until the mould 38 has been filled completely, which appears from the fact that the safety valve 37 starts operating. At that moment the following manipulations are then carried out. First, the cooling ring 41 is removed. The supply device 28 is stopped. The heating device 40 is removed from the mould 38. The rotatable part 30 of the feeding device 29 is turned 180°. The cooled mould 39 is screwed off and replaced by an empty mould. The heating device is provided around the empty mould. The supply device is again put into operation. The cooling ring is brought around the lower part of the mould 38 (now in the lowermost position of Figure 5) to be cooled, after which all the foregoing manipulations are repeated.

The total time necessary for cooling should not be longer than the time in which the empty mould is filled again because otherwise discharge of larger quantities of material would occur. Since the cooling time is more or less established by the dimensions of the mould and the properties of the initial material, this is at the same time a restriction upon the maximum capacity of the supply device. A larger capacity can be obtained by filling and cooling several moulds at the same time. This is of particular importance in the case of the manufacture of elongated pieces of smaller diameters, also for restricting the time when the machine stops during changing of the moulds.

During the filling of the moulds, air can escape from them along the screw threads of the screw cap (not shown) present at the top of the mould.

It has been shown that various means may be used in the process for supplying the preheated fluid material under pressure, provision always being made for allowing the admission of new fluid material to the mould to compensate for the shrinkage all during the cooling process. The cooling takes place from a point on the mould farthest removed from the point of admission of the fluid material and progresses towards the latter point at a regulatable rate. It has been shown that to insure that new fluid material under pressure can be forced at this pressure into the mould, an overflow valve of the type shown in Figure 5 may be employed. The overflow may be of course collected and reprocessed or, as previously described, fed to other moulds where the process is repeated. The process finds utility in the production of bars, blocks and the like, of polyamide materials generally, and specifically the process finds unique utility in the production of such objects from polyamino caproic acid produced in a continuous conversion column from epsilon-caprolactam.

What is claimed is:

1. A process for moulding homogeneous elongated articles of a plastic substance comprising synthetic polyamides and the like having a narrow melting range, comprising filling a preheated elongated mould by feeding into it a substantially constant stream of said plastic substance in molten condition, progressively cooling the contents of the mould in a direction from one end thereof toward the other end of the mould having the feed opening therein while continuing to feed said substantially constant stream of molten plastic substance under pressure to the filled mould during the cooling thereof to compensate for shrinkage of the contents of the mould during said cooling, and diverting to an overflow collecting chamber at a predetermined constant pressure that part of the feed of said molten plastic substance which is in excess of that necessary to compensate for the shrinkage of the contents of the mould as it cools.

2. A process for moulding homogeneous elongated articles of a plastic substance comprising synthetic polyamides and the like having a narrow melting range, comprising filling a preheated elongated mould by feeding into it a substantially constant stream of said plastic substance in molten condition, progressively cooling the contents of the mould in a direction from one end thereof toward the other end of the mould having the feed opening therein while continuing to feed said substantially constant stream of molten plastic substance under pressure to the filled mould during the cooling thereof to compensate for shrinkage of the contents of the mould during said cooling, and diverting to another mould similar to the first mould at a predetermined constant pressure that part of the feed of said molten plastic substance which is in excess of that necessary to compensate for the shrinkage of the contents of the first mould as it cools.

3. A process for moulding homogeneous elongated articles of a plastic substance comprising a high molecular weight polyamino caproic acid substance derived by condensation of epsilon-caprolactam, comprising filling a preheated elongated mould by feeding into it a substantially constant stream of said plastic substance in molten condition, progressively cooling the contents of the mould in a direction from one end thereof toward the other end of the mould having the feed opening therein while continuing to feed said substantially constant stream of molten plastic substance under pressure to the filled mould during the cooling thereof to compensate for shrinkage of the contents of the mould during said cooling, and diverting to another mould similar to the first mould at a predetermined constant pressure that part of the feed of said molten plastic substance which is in excess of that necessary to compensate for the shrinkage of the contents of the first mould as it cools.

4. A process for moulding homogeneous elongated articles of a plastic substance comprising a high molecular weight polyamino caproic acid substance derived by condensation of epsilon-caprolactam, comprising filling a preheated elongated mould by feeding into it a substantially constant stream of said plastic substance in molten condition, progressively cooling the contents of the mould in a direction from one end thereof toward the other end of the mould having the feed opening therein while continuing to feed said substantially constant stream of molten plastic substance under pressure to the filled mould during the cooling thereof to compensate for shrinkage of the contents of the mould during said cooling, and diverting to an overflow collecting chamber at a predetermined constant pressure that part of the feed of said molten plastic substance which is in excess of that necessary to compensate for the shrinkage of the contents of the mould as it cools.

5. Apparatus for moulding homogeneous elongated articles of a plastic substance comprising synthetic polyamides and the like having a narrow melting range, comprising a feed mechanism adapted to supply a substantially constant stream of said molten plastic substance connected through a supply line to an elongated mould provided with means for heating same and for deaerating and progressively cooling said mould from one end of the mould to the other end of the mould having the feed opening therein, and in said supply line an overflow device provided with a pressure valve leading to an overflow line.

6. Apparatus for moulding homogeneous elongated articles of a plastic substance comprising synthetic polyamides and the like having a narrow melting range, comprising a feed mechanism adapted to supply a substantially constant stream of said molten plastic substance connected through a supply line to an elongated mould provided with means for progressively cooling said mould from one end of the mould to the other end of the mould having the feed opening therein, and in said supply line an overflow device provided with a pressure valve leading to an overflow line connected to a second mould to be filled, said mould being provided with means for heating and deaerating, and in said overflow line an additional overflow device provided with a safety valve.

7. Apparatus for casting homogeneous elongated articles of a plastic substance comprising synthetic polyamides and the like having a narrow melting range, comprising a column for continuously polymerizing $\epsilon$-caprolactam to said molten plastic substance, a feed mechanism adapted to supply a substantially constant stream of the molten plastic substance from said column through a supply line to an elongated mould provided with means for progressively cooling said mould from one end of the mould to the other end of the mould having the feed opening, and in said supply line an overflow device provided with a pressure valve, leading to an overflow line connected to a second mould to be filled, said mould being provided with means for heating and deaerating same, and in said overflow line an additional overflow device provided with a safety valve.

References Cited in the file of this patent

UNITED STATES PATENTS

| Number | Name | Date |
|---|---|---|
| 993,321 | Coddington | May 23, 1911 |
| 2,215,733 | Gibb et al. | Sept. 24, 1940 |
| 2,276,691 | Gibb | Mar. 17, 1942 |
| 2,305,362 | Taylor | Dec. 15, 1942 |
| 2,309,729 | Gordon | Feb. 2, 1943 |
| 2,367,204 | Cousino | Jan. 16, 1945 |